United States Patent [19]
Takayama

[11] Patent Number: 4,679,072
[45] Date of Patent: Jul. 7, 1987

[54] COLOR ADJUSTING DEVICE

[75] Inventor: Makoto Takayama, Kanagawa, Japan

[73] Assignee: Canon Kabushiki Kaisha

[21] Appl. No.: 808,868

[22] Filed: Dec. 13, 1985

[30] Foreign Application Priority Data

Dec. 20, 1984 [JP] Japan .................................. 59-269883

[51] Int. Cl.⁴ .......................... H04N 1/46; H04N 9/77
[52] U.S. Cl. ................................... 358/80; 358/29 C; 358/27
[58] Field of Search ....................... 358/75, 80, 76, 78, 358/29 C, 27, 28, 30

[56] References Cited

U.S. PATENT DOCUMENTS

| | | | |
|---|---|---|---|
| 4,293,873 | 10/1981 | Barendregt | 358/75 |
| 4,477,833 | 10/1984 | Clark | 358/80 |
| 4,500,972 | 2/1985 | Kuhn | 358/80 |
| 4,602,277 | 7/1986 | Guichard | 358/27 |

*Primary Examiner*—Howard W. Britton
*Attorney, Agent, or Firm*—Toren, Mcgeady & Associates

[57] ABSTRACT

The color adjusting device of the invention is provided with coordinate axis converting means in which a plurality of independent chrominance signals at the respective inlets after having been converted with respect to the coordinate axes based on a linear equation whose terms include trigonometrical functions, are placed onto respective outlets. This coordinate axis converting means includes memories operating with preset certain functions, and, moreover, has a function of turning the axes for the ordinates of the chrominance signals about their origin in the common plane, and includes vector level control means for the chrominance signals in the turned axes. That coordinate axis converting means further includes means receptive of the chrominance signals for producing a luminance signal and means for controlling the level of the luminance signal.

12 Claims, 8 Drawing Figures

COLOR ADJUSTING DEVICE

BACKGROUND OF THE INVENTION

1. Field of the Invention

This invention relates to a color adjusting device suited to video instruments such as video printers of the R(red), G(green) and B(blue) input type.

2. Description of the Prior Art

In the color video printer for reproducing images on paper or the like, since the input is comprised of R, G and B signals, for the color balance is adjusted, it has been the general practice in the prior art to change the individual levels of the R, G and B signals.

Hence, it has so far been impossible to control the other adjustments of the level of a luminance signal, color hue and color saturation independently of one another. When the luminance level alone, the color hue alone, or the color saturation alone is desired to change, it has, therefore, been utmost difficult to achieve such adjustments.

SUMMARY OF THE INVENTION

It is, therefore, an object of the invention to provide a color adjusting device which has overcome the above-described drawbacks of the prior art.

Another object is to provide a color adjusting device which makes it able to control the individual adjustments of the color balance, and in particular luminance level, chrominance level, and hue independently of one another.

Still another object is to provide a color adjusting device of simple structure.

To achieve these objects, in an embodiment of the invention, for adjustment of the color hue of the color signals, use is made of memories that convert the input signals by using different trigonometrical functions to one another, thereby giving an advantage that the structure of construction becomes simple.

In another embodiment of the invention, it is after the input signals have once been converted to luminance signal and color difference signals that each signal is made subjected to level adjustment or color hue adjustment, thereby adjusting the luminance level, chrominance level and color hue becomes very easy to perform.

These and other objects and features of the invention will become apparent from the following description of embodiments thereof by reference to the drawings:

DETAILED DESCRIPTION OF THE PREFERRED EMBODIMENTS

The present invention is next described in connection with embodiments thereof.

Figure 1:
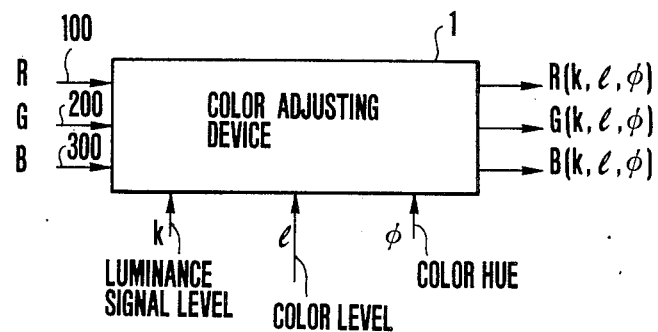
FIG. 1 is a diagram of an example of arrangement of lines for external signals of a color adjusting device of the invention.

In FIG. 1, the signals R, G and B from input lines 100, 200 and 300 are processed in passing through a color adjusting device 1 as the coordinate axis converting means, while the luminance signal level, color level, and color hue are changed independently of each other by respective control signals from input lines k, l and $\phi$. Luminance level-, color level- and color hue-controlled outputs R(k, l, $\phi$) G(k, l, $\phi$) B(k, l, $\phi$) can be produced at respective lines.

The luminance signal Y in NTSC system is expressed in terms of the R, G and B signals as follows:

$$Y = 0.30R + 0.59G + 0.11B \tag{b 1}$$

In order to control the level of the luminance signal, a parameter k is introduced to change that level. Then we have an equation Y(k) for the changed level of the luminance signal as expressed by:

$$Y(k) = k \cdot Y \tag{2}$$
$$= k(0.30R + 0.59G + 0.11B)$$

Figure 2:
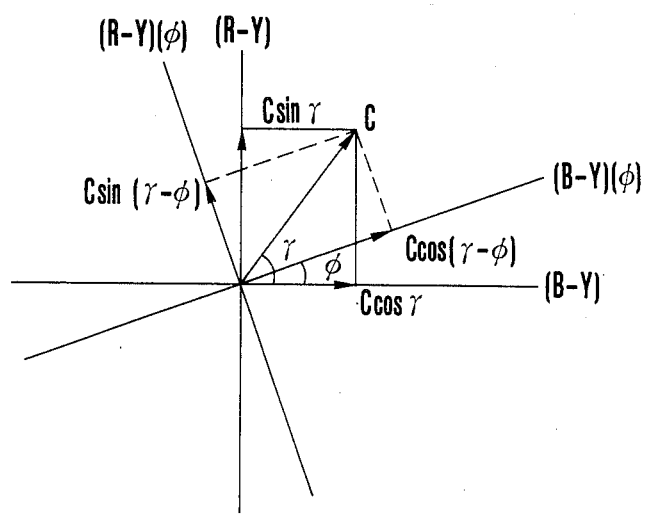
FIG. 2 is a graph taken to explain the principle of the invention.

For another parameter or color hue alone is adjusted, it is only required to transform the coordinates of the color difference signal. In FIG. 2, first assuming that the coordinates of the color signal has, for example, (R−Y) and (B−Y) axes which each contain prescribed coefficients, then the color of saturation C and hue $\gamma$ can be expressed by $$(R - Y) = C \sin \gamma \tag{3}$$

$$(B - Y) = C \cos \gamma \tag{4}$$

To change this color in hue by $\phi$ is to turn the (R−Y) and (B−Y) axes about the origin in their plane by an angle $\phi$. For the turned axes (R−Y)($\phi$) and (B−Y)($\phi$), we have $$(R - Y)(\phi) = C \sin(\gamma - \phi) \tag{5}$$

$$(B - Y)(\phi) = C \cos(\gamma - \phi) \tag{6}$$

By expanding the equations (5 and 6) and substituting the equations (3) and (4), upon rearrangement, we obtain $$(R - Y)(\phi) = C \sin(\gamma - \phi) \tag{7}$$
$$= C \sin\gamma \cos\phi - C \cos\gamma \sin\phi$$
$$= (R - Y) \cos\phi - (B - Y) \sin\phi$$

$$(B - Y)(\phi) = C \cos(\gamma - \phi) \tag{8}$$
$$= C \cos\gamma \cos\phi + C \sin\gamma \sin\phi$$
$$= (B - Y) \cos\phi + (R - Y) \sin\phi$$

Still another axis (G−Y) ($\phi$) of the coordinate of the hue-changed (G−Y) signal is expresses as follows: Letting the hue-changed R, G, B and Y signals be denoted by R($\phi$), G($\phi$), B($\phi$) and Y($\phi$), the luminance signal level does not change with change of the color hue since the coordinates are only transformed, thus $$Y = Y(\phi) = 0.3R(\phi) + 0.59G(\phi) + 0.11B(\phi) \tag{9}$$

$$0.59\{G(\phi) - Y(\phi)\} = -0.3\{R(\phi) - Y(\phi)\} - 0.11\{B(\phi) - Y(\phi)\}$$

$$(G - Y)(\phi) = -\frac{0.3(R - Y)(\phi) + 0.11(B - Y)(\phi)}{0.59}$$

For note, the (R−Y) and (B−Y) signals in the NTSC system are expressed as follows:

$$(R-Y) = 0.70R - 0.59G - 0.11B \quad (10)$$

$$(B-Y) = -0.30R - 0.59G + 0.89B \quad (11)$$

As to adjustment of the color vector level, when the color level is changed by a parameter $l$, the resultant color difference signals $(R-Y)(l), (B-Y)(l), (G-Y)(l)$ are $$(R-Y)(l) = l \cdot (R-Y) \quad (12)$$

$$(B-Y)(l) = l \cdot (B-Y) \quad (13)$$

$$(G-Y)(l) = l \cdot (G-Y) \quad (14)$$

Then when both parameters $\phi$ and $l$ are simultaneously changed, the color difference signals become $$(R-Y)(l,\phi) = l \cdot (R-Y)(\phi) \quad (15)$$

$$(B-Y)(l,\phi) = l \cdot (B-Y)(\phi) \quad (16)$$

$$(G-Y)(l,\phi) = l \cdot (G-Y)(\phi) \quad (17)$$

Therefore, equations for the chrominance signals in terms of three parameters $k$, $l$ and $\phi$ are obtained as follows:

$$R(k,l,\phi) + Y(k) + (R-Y)(l, \phi) \quad (18)$$

$$G(k,l,\phi) + Y(k) + (G-Y)(l, \phi) \quad (19)$$

$$B(k,l,\phi) = Y(k) + (B-Y)(l, \phi) \quad (20)$$

By substituting the equations (2), (7), (8), (9), (10), (11), (15), (16) and (17) into the equations (18), (19) and (20), and rearranging them, we find $$R(k,l,\phi) = \{0.30k + l(0.30 \sin\phi + 0.70 \cos\phi)\}R + \quad (21)$$
$$0.59\{k + l(\sin\phi - \cos\phi)\}G + \{0.11 k - l(0.89 \sin\phi + 0.11 \cos\phi)\}B$$

$$G(k,l,\phi) = \{0.30k - l(0.28 \sin\phi - 0.30 \cos\phi)\}R + \quad (22)$$
$$\{0.59k - l(0.19 \sin\phi - 0.41 \cos\phi)\}G +$$
$$\{0.11k + l(0.49 \sin\phi - 0.11 \cos\phi)\}B$$

$$B(k,l,\phi) = \{0.30k + l(0.70 \sin\phi - 0.30 \cos\phi)\}R + \quad (23)$$
$$0.59\{k - l(\sin\phi + \cos\phi)\}G + \{0.11 k - l(0.11 \sin\phi - 0.89 \cos\phi)\}B$$

Since these are linear equations in terms of three signals R, G and B whose coefficients each contain all three parameters $k$, $l$ and $\phi$ for the luminance signal level, color level and color hue respectively, it is to be understood from the equations (21) to (23) that for the given three inputs, say, R, G, B, we can obtain desired outputs $R(k,l,\phi)$, $G(k,l,\phi)$, $B(k,l,\phi)$ when the parameters $k$, $l$ and $\phi$ are appropriately varied.

Figure 3:
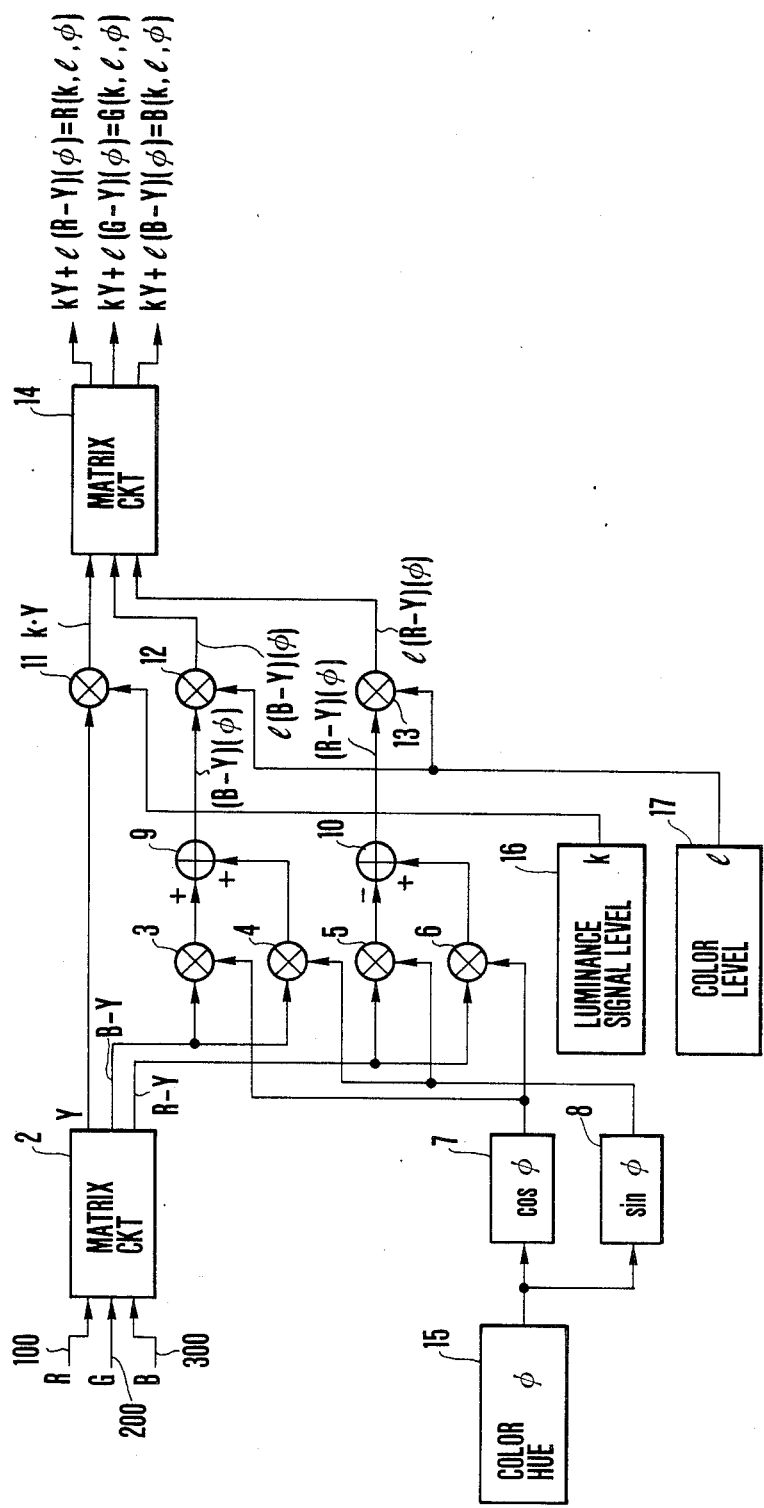
FIGS. 3 to 8 are block diagrams of first to sixth embodiments of the invention.

The color adjusting device of FIG. 1 is designed to realize the computation based on the equations (21) to (23). A first embodiment of the invention is shown in FIG. 3 where a plurality of independent inputs or chrominance signals in the form of R, G and B signals are applied through respective input lines 100, 200 and 300 as channel means to a matrix circuit 2 as first matrix means which produces three outputs in the form of Y, $(R-Y)$ and $(B-Y)$ signals. This transformation is carried out based on the equations (1), (10) and (11). The matrix circuit 2 may be constructed either by semiconductor read only memories (ROM), or by an analog computer circuit. The Y signal is applied to a multiplier 11 cooperating with a dial 16 for setting values of the parameter k for the level of luminance signal to produce an output signal representing kY. This signal is then applied to second matrix means or circuit 14. For note, the multiplier 11 constitutes luminance signal level control means.

The $(B-Y)$ signal is applied to multipliers 3 and 4, and the $(R-Y)$ signal to multipliers 5 and 6. A hue dial 15 as angle control means produces an output representing the preset value of hue parameter $\phi$ which is applied to $\cos \phi$ and $\sin \phi$ generators 7 and 8. The output of the $\cos \phi$ generator is connected to the multipliers 3 and 6, and the output of the $\sin \phi$ generator is connected to the multipliers 4 and 5. By adding the outputs of the multipliers 3 and 4 is obtained a $(R-Y)(\phi)$ signal at the output of an adder 9. Another adder 10 receptive of the outputs of the multipliers 5 and 6 produces a $(B-Y)(\phi)$ signal at the output thereof. The parts 3 to 10 constitute hue shifting means.

A color level dial 17 produces an output which is multiplied by the outputs of the adders 9 and 10 in respective multipliers 12 and 13 as color difference level control means to obtain signals $(B-Y)$ $(l,\phi)$ and $(R-Y)(l,\phi)$ respectively.

From $Y(k)$, $(B-Y)(l,\phi)$ and $(R-Y)(l,\phi)$ signals, the second matrix circuit 14 forms $R(k, l, \phi)$, $G(k, l, \phi)$ and $B(k, l, \phi)$. This circuit 14 is constructed with ROM consisting of semiconductor memories.

Figure 4:
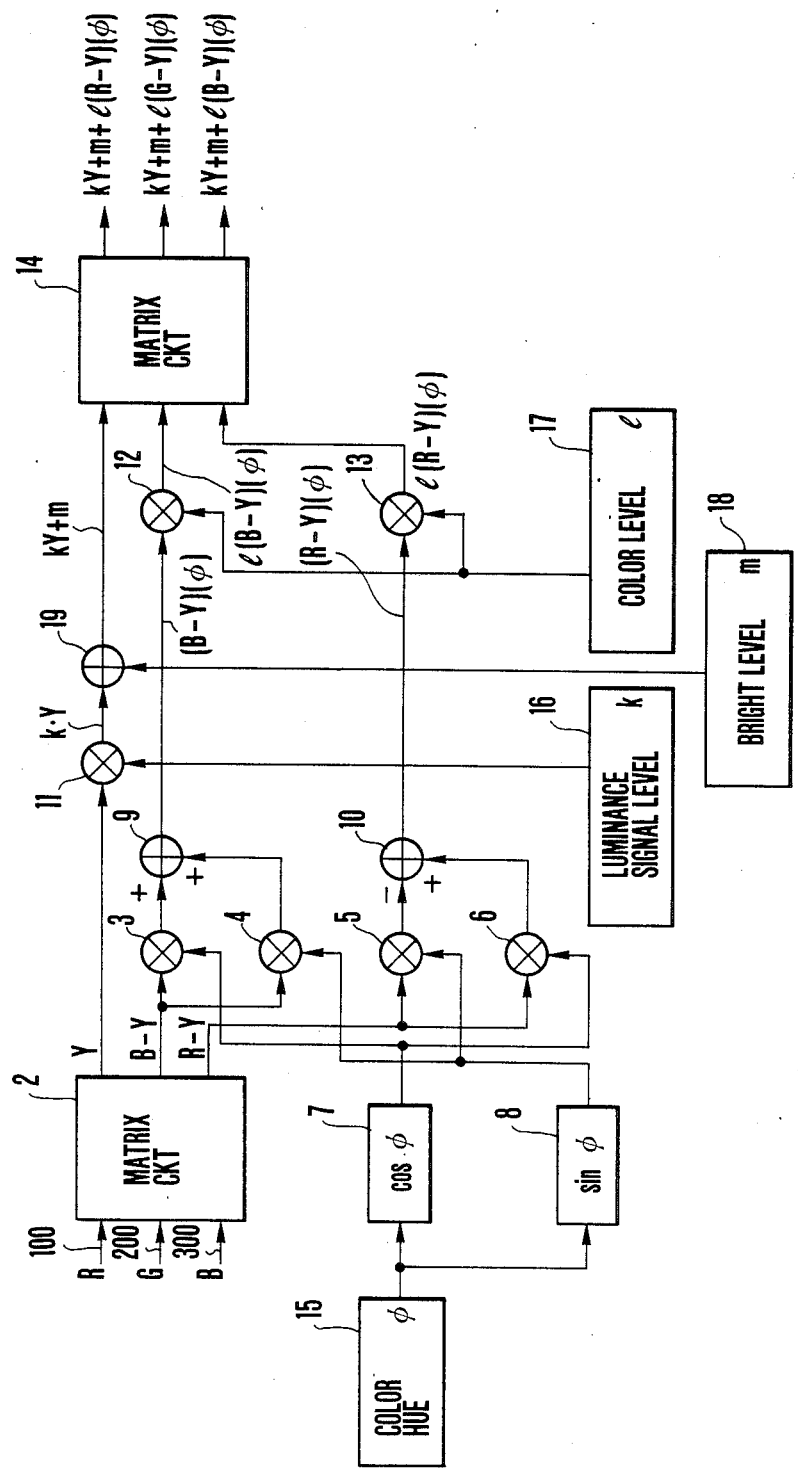

FIG. 4 shows a second embodiment of the invention in which an additional dial 18 is provided for setting brightness levels in combination with an adder 19 for adding the output m of the dial 18 to the output of the multiplier 11, thereby the brightness level can be controlled also independently. For note, the adder 19 constitutes part of the luminance signal level control means.

That is, in this embodiment, for the R, G and B inputs, the circuit produces outputs $R(k,l,m,\phi)$, $G(k,l,m,\phi)$, $B(k,l,m,\phi)$ based on the following equations:

$$R(k,l,m,\phi) = kY + m + l(R-Y)(\phi) \quad (24)$$

$$G(k,l,m,\phi) = kY + m + l(G-Y)(\phi) \quad (25)$$

$$B(k,l,m,\phi) + kY + m, + l(B-Y)(\phi) \quad (26)$$

Figure 5:
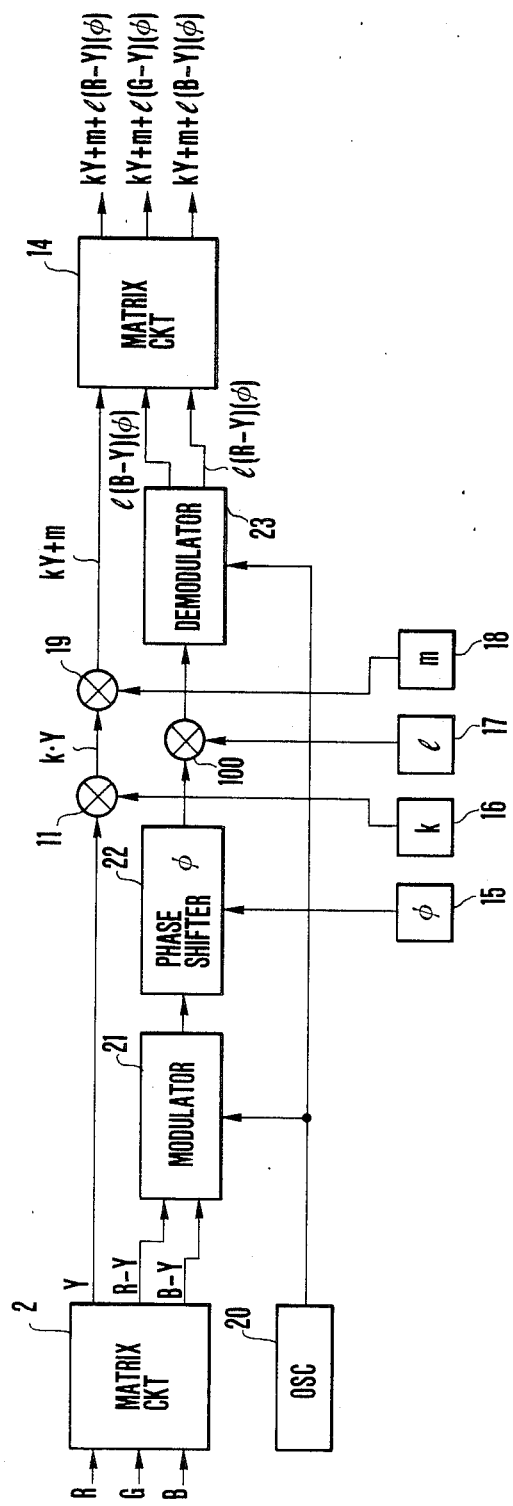

A third embodiment of the invention is shown in FIG. 5. The input signals R, G and B are transformed to Y, $(R-Y)$ and $(B-Y)$ signals by the first matrix circuit 2. The Y signal in the multiplier 11 becomes a kY signal and further kY+m signal by the adder 19, which is applied to the second matrix circuit 14.

The $(R-Y)$ and $(B-Y)$ signals are then modulated in balance by a modulator 21 and then changed in hue parameter $\phi$ by a variable phase shifter 22. The output signal of this shifter 22 is multiplied by the color level parament $l$ in a multiplier 100. Then by a demodulator 23 are obtained signals $(R-Y)(l,\phi)$ and $(B-Y(l,\phi)$. An oscillator 20 is further included for supplying a carrier signal to the modulator 21 and the demodulator 23.

The second matrix circuit 14 transforms $Y(k,m)$, $(B-Y)(l,\phi)$, $(R-Y)(l,\phi)$ to $R(k,l,m,\phi)$, $G(k,l,m,\phi)$, $B(k,l,m,\phi)$.

Figure 6:
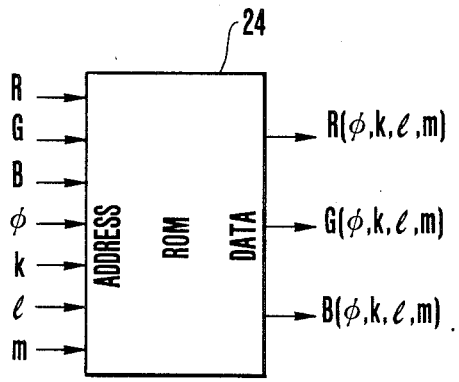

FIG. 6 show a fourth embodiment of the invention in which for a plurality of values of each of the variables and parameters R, G, B, $\phi$, k, l and m, the computed results based on the equations (24), (25) and (26) are tabled and stored in a ROM 24 as memory means so that when the ROM 24 is addressed by each of R, G, B, φ, k, l, m, R(φ, k, l, m), G(φ, k, l, m) and B(φ, k, l, m) defined by the linear equations (24) to (26) are produced. The use of such memory means makes it possible to achieve a very large reduction in the structure of construction, but it must have a very large memory capacity.

Figure 7:
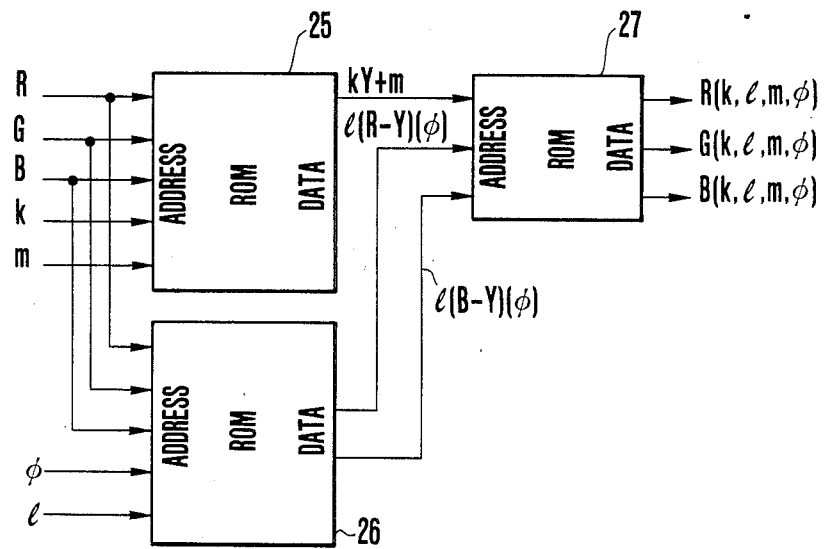

To reduce the total memory capacity, the ROM may be divided into parts as in a fifth embodiment of the invention. In FIG. 7, a function:kY+m is tabulated for R, G, B, k and m in first memory means or ROM 25. Functions:l(R−Y)(φ) and l(B−Y)(φ) are tabulated for R,G, B, φ and l in second memory means or ROM 26. Third memory means or ROM 27 has the same function as that of the matrix circuit 14 so that when addressed by kY+m, l(R−Y)(φ) and l(B−Y)(φ), the functions R(k, l, m, φ), G(k, l, m, φ), and B(k, l, m, φ) are produced. What is characteristic of the ROMs 25 and 26 is that besides the input terminals for all the chrominance signals R, G and B, there are additional ones for the parameters k, m, φ and l. Though such a system has an increased number of ROM units, an advantage is produced that the total memory capacity is reduced.

Figure 8:
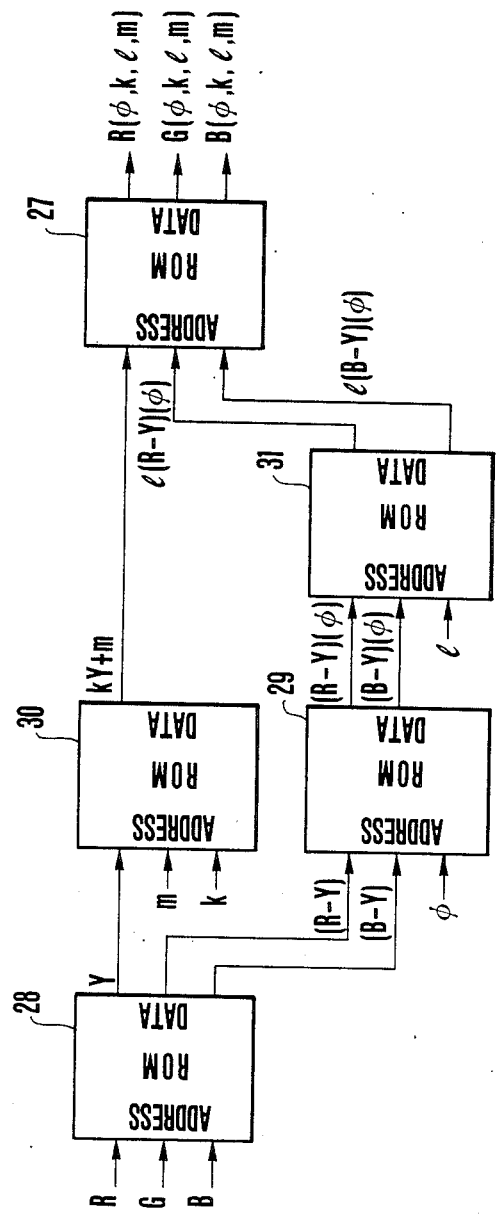

To further reduce the memory capacity, the number of ROM units is further increased in a sixth embodiment of the invention as shown in FIG. 8 where 27, 28, 29, 30 and 31 are ROMs. The ROM 28 as fourth memory means is addressed by R, G and B and produces Y, (R−Y) and (B−Y). The ROM 29 as sixth memory means is addressed by (R−Y), (B−Y) and φ and produces (R−Y)(φ) and (B−Y)(φ).

The ROM 30 as fifth memory means is addressed by Y, m, and k, and produces kY+m, and the ROM 31 is addressed by (R−Y)(φ), (B−Y)(φ) and l, and produces l(R−Y)(φ) and l(B−Y)(φ).

The ROM 27 as seventh memory means has the same function as that of the ROM 27 of FIG. 7. For note, if the ROMs 24 to 31 are semiconductor memories, it is easy to minimize the size of the system.

According to this or sixth embodiment, each ROM itself may have a small memory capacity, and even as a whole a small capacity suffices for constructing the system of the invention.

Though the foregoing embodiments of the invention have been described in connection with memories or a computing circuit for transforming the coordinates of the chrominance signals, it is to be understood that the present invention is not confined thereto. It also covers systems using microcomputers capable of computing either the equations (18) to (20), or (21) to (23), or (24) to (26) in transforming the coordinate axes.

Though, in the first, second, third, fifth and sixth embodiments, adjustment of the color hue is made with the use of the two color difference signals (R−Y) and (B−Y), other color difference signals (for example, (R−G) and (B−G) may be used to obtain an equivalent result.

Also, the present invention is applicable not only to NTSC system but to PAL and SECAN systems, with a slight modification that each coefficient of the terms R, G and B in the matrix for making up the Y signal from the R, G and B signals is altered.

If the inputs of the color adjusting device are Y and two color difference signals such as (R−Y) and (B−Y), those of the parts of the computing circuit or the memories which transform R, G and B to Y and the two color difference signals may be omitted.

Also if the outputs of the device are Y and two color difference signals such as (R−Y) and (B−Y), there is need only to add a computing circuit or memories for forming the Y and the two color difference signals from the R, G and B.

As has been described above, according to the present invention, a color adjusting device receptive of a plurality of independent chrominance signals and capable of adjusting the hue of the input color alone can be obtained.

What is claimed is:

1. A color adjusting device comprising:
    (a) a plurality of channel means for inputting a plurality of chrominance signal informations;
    (b) memory means for transforming the levels of said plurality of chrominance signal informations coming in through said plurality of channel means based on respective different functions from one another, whereby said functions of said memory means are expressed by linear equations whose terms include trigonometrical functions.

2. A device according to claim 1, wherein said memory means includes first memory means for forming luminance signal information from the plurality of chrominance signal informations and second memory means for forming color difference signal informations from said plurality of chrominance signal informations.

3. A device according to claim 2, wherein said memory means further includes third memory means for forming a plurality of independent chrominance signal informations by using the output signals of said first and said second memory means.

4. A device according to claim 2, wherein said first and second memory means each have terminals for inputting said plurality of chrominance signal informations and, besides said terminals, signal input terminals for varying the individual outputs of said first and said second memory means.

5. A device according to claim 1, wherein said memory means includes fourth memory means receptive of said plurality of chrominance signal information for producing a luminance signal information and two color difference signals, fifth memory means for linearly transform the luminance signal information formed by said fourth memory means, sixth memory means for transforming the two color difference signals formed by said fourth memory means based on respective prescribed trigonometrical functions, and seventh memory means for forming a plurality of independent chrominance signal information by using the outputs of said fifth and sixth memory means.

6. A color adjusting device comprising:
    (a) a plurality of channel means for inputting a plurality of chrominance signal informations;
    (b) first matrix means receptive of the plurality of chrominance signal informations through said plurality of channel means for producing a luminance signal information and a plurality of color difference signal informations;
    (c) luminance level control means for controlling the level of the luminance signal information formed by said first matrix means;
    (d) phase shifting means for transforming the plurality of color difference signal informations formed by said first matrix means based on respective prescribed trigonometrical functions;

(e) angle control means for controlling the angle variable of the trigonometrical functions in said phase shifting means; and (f) color difference level control means for controlling the common level of the plurality of color difference signal informations in said phase shifting means.

7. A device according to claim 6, further comprising second matrix means receptive of the plurality of color difference signal informations through said phase shifting means and the luminance signal information through said luminance level control means for producing a plurality of independent chrominance signal informations.

8. A device according to claim 6, wherein said plurality of color difference signal informations include difference informations between the red chrominance signal information and the luminance signal information and between the blue chrominance signal information and the luminance signal information.

9. A device according to claim 6, wherein said plurality of chrominance signal informations include chrominance signal informations of red color, green color and blue color.

10. A device according to claim 6, wherein said first matrix means includes a semiconductor memory.

11. A device according to claim 6, wherein said phase shifting means includes a semiconductor memory.

12. A device according to claim 7, wherein said second matrix means includes a semiconductor memory.

* * * * *